(12) United States Patent  
Turland

(10) Patent No.: US 10,039,987 B2  
(45) Date of Patent: Aug. 7, 2018

(54) METHODS AND SYSTEMS FOR AN INPUT DEVICE WITH AN E-COMMERCE BUTTON

(71) Applicant: Activision Publishing, Inc., Santa Monica, CA (US)

(72) Inventor: Paul Turland, Leamington Spa (GB)

(73) Assignee: Activision Publishing, Inc., Santa Monica, CA (US)

( * ) Notice: Subject to any disclaimer, the term of this patent is extended or adjusted under 35 U.S.C. 154(b) by 360 days.

(21) Appl. No.: 14/133,501

(22) Filed: Dec. 18, 2013

(65) Prior Publication Data

US 2015/0165328 A1 Jun. 18, 2015

(51) Int. Cl.
| | |
|---|---|
| *A63F 13/20* | (2014.01) |
| *A63F 13/792* | (2014.01) |
| *G06Q 30/06* | (2012.01) |
| *A63F 13/24* | (2014.01) |
| *A63F 13/85* | (2014.01) |

(52) U.S. Cl.
CPC ............ *A63F 13/792* (2014.09); *A63F 13/24* (2014.09); *A63F 13/85* (2014.09); *G06Q 30/0633* (2013.01); *G06Q 30/0643* (2013.01)

(58) Field of Classification Search
CPC .......... A63F 2300/10; A63F 2300/1018; A63F 2300/1062; A63F 13/24
See application file for complete search history.

(56) References Cited

U.S. PATENT DOCUMENTS

| 7,207,885 | B2 * | 4/2007 | Longman | G06F 3/0338 345/156 |
|---|---|---|---|---|
| 7,359,871 | B1 * | 4/2008 | Paasche | G06Q 30/02 705/26.8 |
| 2002/0010641 | A1 * | 1/2002 | Stevens | G06Q 30/02 705/26.1 |
| 2004/0235567 | A1 * | 11/2004 | Chatani | A63F 13/12 463/42 |
| 2005/0239524 | A1 * | 10/2005 | Longman | G06Q 40/04 463/9 |
| 2005/0282636 | A1 * | 12/2005 | O'Brien | A63F 13/10 463/42 |
| 2007/0073596 | A1 * | 3/2007 | Alexander | G06Q 30/02 705/26.1 |
| 2008/0113789 | A1 * | 5/2008 | Canessa | G07F 17/323 463/29 |
| 2008/0147680 | A1 * | 6/2008 | Mitsuhashi | G06Q 10/087 |
| 2008/0234049 | A1 * | 9/2008 | LeBlanc | G07F 17/323 463/42 |

(Continued)

OTHER PUBLICATIONS http://mario.wikia.com/wiki/P-Wing,published on Mar. 14, 2012, retrieved on Apr. 17, 2017, p. 1.

(Continued)

*Primary Examiner* — Kevin Carter  
(74) *Attorney, Agent, or Firm* — Klein, O'Neill & Singh, LLP

(57) ABSTRACT

The present invention relates generally to e-commerce systems and methods, and more particularly, e-commerce systems and methods relating to an input device with an e-commerce button useful in conducting e-commerce transactions. Generally, the e-commerce button can be used to conduct various e-commerce transactions, depending on context and/or programming.

17 Claims, 11 Drawing Sheets

(56) References Cited

U.S. PATENT DOCUMENTS

| | | | | |
|---|---|---|---|---|
| 2011/0023689 A1* | 2/2011 | Ivanich | ............... | G10H 1/0016 84/609 |
| 2011/0321071 A1* | 12/2011 | McRae | ................. | G06Q 30/06 725/5 |
| 2012/0004041 A1* | 1/2012 | Pereira | ...................... | A63F 9/24 463/42 |
| 2012/0038549 A1* | 2/2012 | Mandella | ............ | G06F 3/03545 345/156 |
| 2012/0272189 A1 | 10/2012 | Su | | |
| 2013/0344960 A1* | 12/2013 | Perry | ..................... | A63F 13/12 463/32 |
| 2014/0073416 A1* | 3/2014 | Toyama | ............. | G07F 17/3251 463/25 |
| 2014/0279426 A1* | 9/2014 | Holman | ............ | G06Q 30/0207 705/39 |
| 2015/0100476 A1* | 4/2015 | Agapitov | ............ | G06Q 20/123 705/39 |

OTHER PUBLICATIONS http://web.archive.org/web/20120501000000*/http://mario.wikia.com/wiki/P-Wing, retrieved on Apr. 17, 2017, pp. 1-3.
http://web.archive.org/web/20120314055426/http://mario.wikia.com/wiki/P-Wing, retrieved on Apr. 17, 2017, p. 1.
U.S. Appl. No. 14/103,785, filed Dec. 11, 2013, Gordan Hall, Anthony Gowland, US 2015-0157929 A1, Office Action dated Apr. 20, 2017, Response to Office Action dated Oct. 20, 2017.

* cited by examiner

METHODS AND SYSTEMS FOR AN INPUT DEVICE WITH AN E-COMMERCE BUTTON

BACKGROUND OF THE INVENTION

The present invention relates generally to e-commerce systems and methods, and more particularly, e-commerce systems and methods relating to an input device with an e-commerce button useful in conducting e-commerce transactions.

Electronic commerce (or "e-commerce") refers to the buying and selling of goods and/or services using electronic systems such as the Internet and other computer networks. Using e-commerce channels, retailers, manufacturers, and distributors can market and sell goods and/or services to consumers and purchasers through online stores having virtual storefronts. Commonly, consumers access these online stores using, for example, a web browser. More recently, consumers are able to access these online stores through storefronts within applications, for example, a virtual store within a videogame or some virtual environment, a dedicated e-commerce application, or any other application in which a user is presented with purchasing opportunities.

The selection of goods and/or services from the electronic catalogs within the online stores may use a "shopping cart" model. When the consumer selects goods and/or services from the electronic catalog, the online store adds those goods and/or services to the consumer's virtual shopping cart. When the consumer is done selecting goods and/or services, the goods and/or services in the shopping cart may be reviewed and ultimately purchased. To purchase the items in the shopping cart, the consumer provides his/her billing and shipping information. The entire process of purchasing goods and/or services from an online store typically require many interactions from the consumer (e.g., adding goods and/or services to a shopping cart, reviewing the shopping cart, adding billing and shipping information, and confirming the purchase).

E-commerce retailers have taken steps to simplify this process. For example, by allowing purchasers to create user accounts at the online store, the online store can automatically-populate the consumer's billing and shipping information. Nevertheless, the process is still often time consuming and cumbersome. This problem is made worse for purchases made from within application in which the consumer is immersed in another activity, for example, playing a videogame or consuming streaming media. When videogame player is immersed in gameplay and presented a purchasing opportunity, it is often undesirable for the videogame player to interrupt gameplay to go through the steps of purchasing the item. Similarly, when a user is consuming a media stream (for example, an Internet video or audio stream) and is presented with a purchasing opportunity, it may be undesirable to the user to interrupt the media stream to purchase the item. The present invention addresses these and other problems in conducting e-commerce transactions.

BRIEF SUMMARY OF THE INVENTION

One aspect of the invention provides a method performed by a videogame system that comprises an input device with an e-commerce button, the method comprising: conducting gameplay; while the gameplay is being conducted and without interrupting gameplay: presenting to a user an item for purchase; detecting the actuation of the e-commerce button; and responsive to detecting the actuation of the e-commerce button, conducting an e-commerce transaction involving the item.

Another aspect of the invention provides a videogame input device comprising: one or more input buttons configured to allow a user to provide input to a videogame console; and an e-commerce button, separate from the one or more input buttons, configured to cause performance of an e-commerce transaction when the e-commerce button is activated.

Another aspect of the invention provides one or more computer-readable storage media having instructions stored thereon that, when executed by a computing device, cause the computing device to perform acts, the acts comprising: presenting to a user a good or service available for purchase; receiving an indication that the user has selected the good or service; detecting an activation of an e-commerce button on an input device; and responsive to detecting the activation of the e-commerce button, performing an e-commerce transaction for the good or service.

These and other aspects of the invention are more fully comprehended upon review of this disclosure.

DETAILED DESCRIPTION

The present invention relates generally to e-commerce systems and methods, and more particularly, e-commerce systems and methods relating to an input device with an e-commerce button useful in conducting e-commerce transactions. Generally, the e-commerce button can be used to conduct various e-commerce transactions, depending on context and/or programming, including tagging purchasable goods and/or services for later review, adding goods and/or services into a user's shopping cart, purchasing goods and/or services, adding goods and/or services to a wish list, adding goods and/or services to a favorites list, gifting goods and/or services to other users, populating the user's billing and shipping information into an order form, and/or any other e-commerce-related transaction or function. In some embodiments, the e-commerce button may be used with online stores accessed through a web browser, such as www.amazon.com or www.ebay.com. In other embodiments, the e-commerce button may be used with applications other than web browsers where users are presented with purchasing opportunities, for example, videogames or streaming media applications. As described herein, the e-commerce button allows the user to conduct e-commerce transactions and functions without substantial interruption to other tasks the user may be performing.

Figure 1:
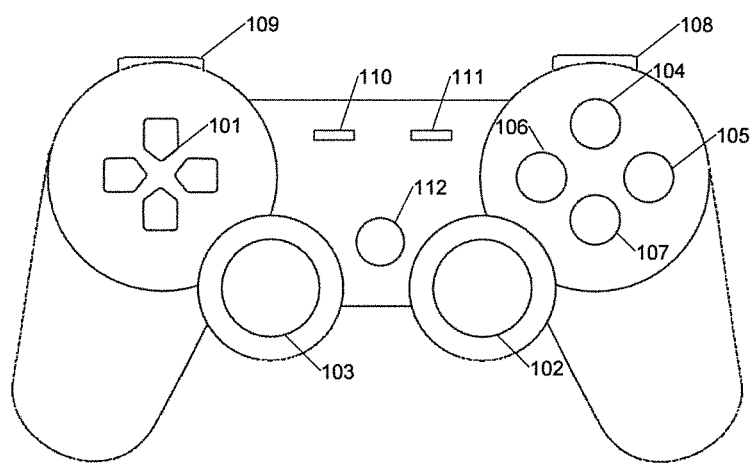
FIG. 1 illustrates an example of an input device in accordance with aspects of the invention.

FIG. 1 shows an exemplary input device 100 in accordance with aspects of the present invention. Input device 100 provides user input to a videogame running on a videogame console, with for example the user input affecting game play of the videogame, depending on the input. The videogame console may be a dedicated videogame console such as a Nintendo Wii, Sony PlayStation, or Microsoft Xbox, or any computing device suitable for conducting videogames, including personal computers, smartphones, tablets, and portable gaming devices. Input device 100 may be paired with the videogame system using wired and/or wireless interfaces.

Input device 100 may comprise various input buttons, including directional pad 101, one or more analog sticks 102, 103, one or more action buttons 104-107, one or more triggers 108, 109, start button 110, and select button 111. These input buttons generally perform functions familiar to one of ordinary skill in the art. For example, directional pad 101 and/or analog sticks 102, 103 may act as direction controllers; that is, actuation signals generated in response to user input by directional pad 101 and/or analog sticks 102, 103 are generally used to control direction in the videogame, such as the direction of movement of an avatar, cursor, crosshair, etc. The actuation signals generated in response to user input by action buttons 104-107 and/or triggers 108, 109 generally prompt an action in the videogame, such as making a selection, firing a weapon, jumping, attacking, etc. Start button 110 and select button 111 may be used to navigate and make selections in menus, pause/resume gameplay, and switch between game modes. Of course, the specific functions relating to play or selection of play of videogames assigned to these input buttons may vary depending on the videogame being or to be played.

In accordance with aspects of the present invention, input device 100 comprises one or more e-commerce buttons 112, which can be used in conducting various e-commerce transactions, including in various embodiments, one, some, or all of tagging purchasable goods for later review, adding goods into the user's shopping cart, purchasing goods, adding goods to a wish list, adding goods to a favorites list, gifting goods to friends, populating the user's billing and shipping information into an order form, or other transaction related actions. The particular e-commerce function performed by the one or more e-commerce buttons may depend on context and/or may be programmed by the user or application.

In the embodiment of FIG. 1, input device 100 comprises only one e-commerce button 112, which is a button separate from the other input buttons and dedicated for use with e-commerce transactions. However, in some embodiments, an existing input button may be used to perform the functions of e-commerce button 112 depending on context and/or as programmed by the user or application, and in some embodiments the input device 100 may include more than one e-commerce button. For example, although select button 111 may generally be used to navigate game menus or options, during gameplay or while in an online store, select button 111 may perform the functions of e-commerce button 112. Additionally or alternatively, the user or application may program an input button to perform the functions of e-commerce button 112. For example, the user may program select button 111 (or any other input button) to perform the functions of e-commerce button 112 either at all times, during gameplay, and/or while in an online store.

Figure 2A:
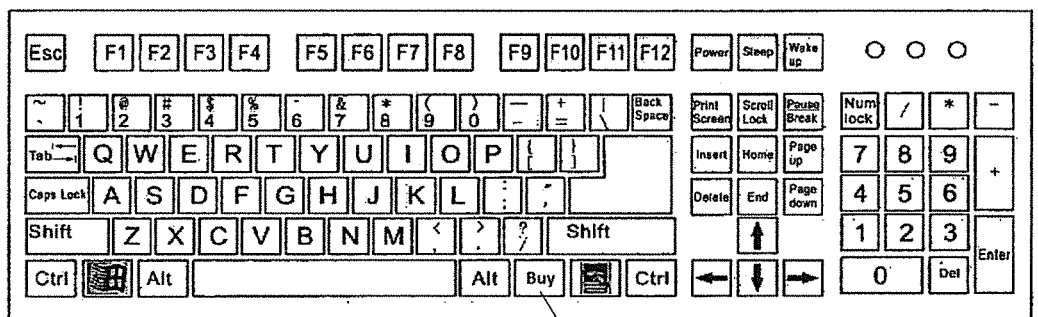
FIG. 2A illustrates another example of an input device in accordance with aspects of the invention.
Figure 2B:
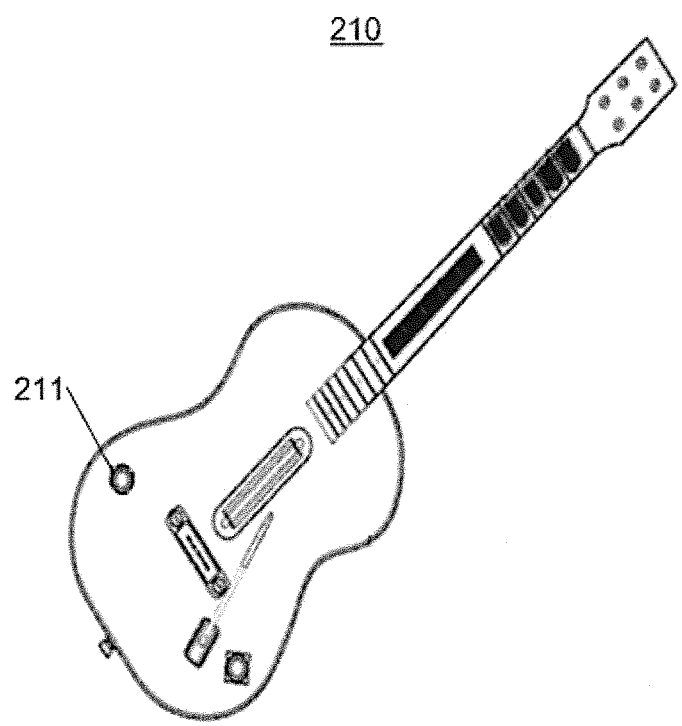
FIG. 2B illustrates another example of an input device in accordance with aspects of the invention.

Input device 100, in the embodiment of FIG. 1 is configured as a gamepad, but in various embodiments any input device may be used. FIGS. 2A-2B show additional exemplary configurations of input devices in accordance with aspects of the present invention. FIG. 2A shows a computer keyboard 200 in accordance with aspects of the invention. In addition to the standard keys, computer keyboard 200 has an additional e-commerce button 201 that performs the functionality of e-commerce button 112. FIG. 2B shows a guitar-shaped input device 210 suitable, for example, for use with a music-based videogame. In some embodiments the input device with an e-commerce button is specially adapted for play of a particular videogame, or genre of videogames. For example, the input device may have a shape representative of an object seen on a screen during game play, for example an object manipulated by a game avatar, or the input device may have inputs for use in game play that are particularly positioned, colored, or otherwise specifically matched to game play activities of a particular videogame or genre of videogames. As an example, similar to input device 100 and computer keyboard 200, guitar-shaped input device 210 comprises an e-commerce button 211, and the guitar-shaped input device may particularly be adapted for use in a particular suite of music-based videogames featuring play or simulated play of a guitar. Of course, other input devices may be used while still embodying aspects of the present invention. As another example, in a gun-related videogame, the input device may be a videogame input device configured in the shape of a gun. And in a driving or vehicle simulation videogame, the videogame input device may be configured in the shape of a steering wheel. As another example, a standard computer mouse may be equipped with an e-commerce button. As described above, in some embodiments, the input devices may be programmed such that an existing input button performs the function of the e-commerce button.

Figure 3:
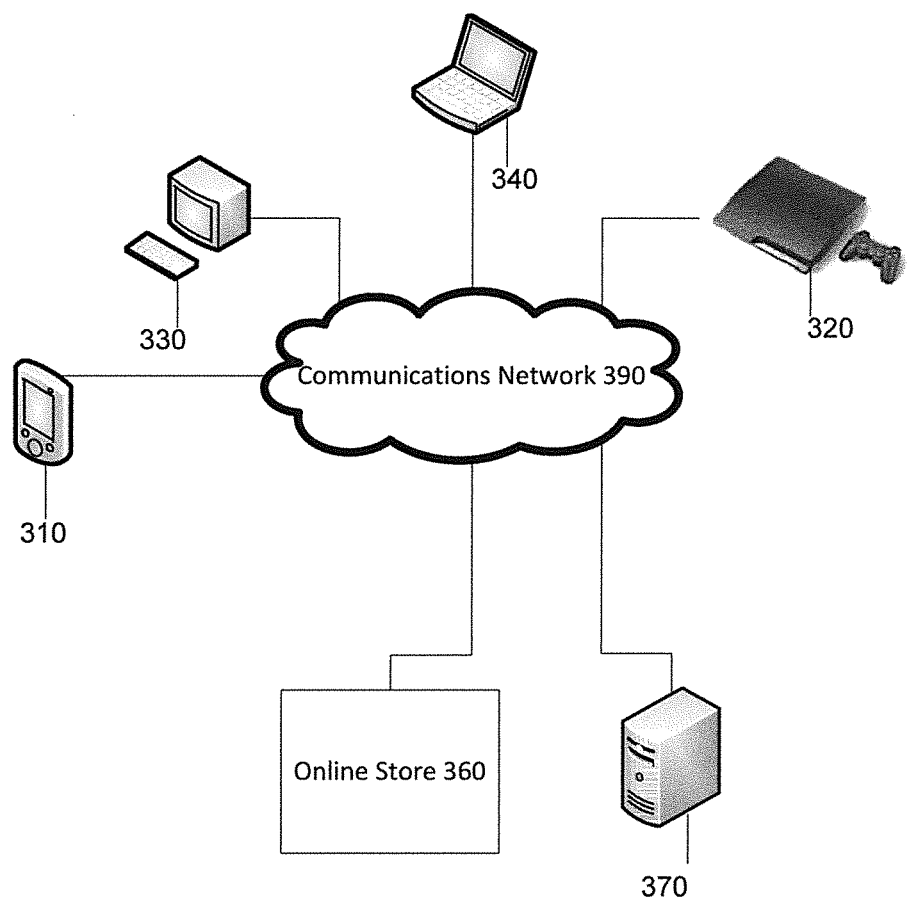
FIG. 3 illustrates an example system in accordance with aspects of the invention.

FIG. 3 illustrates an exemplary system 300 in accordance with aspects of the invention. System 300 provides for various e-commerce transactions using an input device in accordance with aspects of the present invention (for example, the input devices described above). System 300 includes various components, including one or more user devices 310-340, online store 360, application server 370, and communications network 390. Generally, communications network 390 allows for communication and data transmission between the various components of system 300. Communications network 390 may be, for example, the Internet. The number and arrangement of components of system 300 as shown in FIG. 3 are merely exemplary, and in many embodiments, many more devices exist.

System 300 comprises user devices 310-340, which allow a user to conduct e-commerce transactions with online store 360. User devices 310-340 allow users to access online store 360 through a variety of applications and interfaces, including for example, through a web browser, through videogames, through media streaming applications, and any other application in which the user is presented a purchasing opportunity. Generally, user devices 310-340 may be any compute devices suitable for conducting e-commerce transactions and/or communicating over communication network 390. In some embodiments, user device 310-340 are also suitable for conducting videogame play. In the example of FIG. 3, system 300 comprises smartphone 310, videogame console 320, desktop computer 330, and laptop computer 340. Each user device 310-340 has one or more processors, memory, communication circuitry, user input devices, and associated hardware. User devices 310-340 may communicate with other components of system 300 by sending and receiving data through communication network 390. In many embodiments, user devices 310-340 comprise an input device with a dedicated e-commerce button as described in connection with the input devices of FIGS. 1, 2A, and 2B. Although in some embodiments, the functionality of the e-commerce button is associated with one or more existing input buttons on the input device. In some embodiments, the input device of the user device may be integrated into the user device itself, for example, in the case of a smartphone, tablet, or laptop.

The processors of the user devices may be configured by program instructions to provide for videogame play, generally by commanding presentation of a game world from a viewpoint, and based on game world status and inputs received from a user input device to modify the game world status, and possibly the viewpoint. In some embodiments a user may control, through use of the user input device, an avatar in the game world, with the avatar moving about and interacting with the game world and its occupants in accordance with rules of gameplay for a particular videogame. In some embodiments the gameplay is part of networked game play. In such embodiments the user device may communicate changes in game states over the network to other user devices and/or a game server, and may also receive changes in games states over the network from the other user devices and/or game server. In other such embodiments the user devices may communicate inputs from the user input device to another user device or game server, with the other user device or game server determining game states and providing the game states to the user device for presentation.

In some embodiments the input device is commonly housed with one or more processors, for example as may be the case for a smartphone with touchscreen. In some embodiments the user input device is housed separate from the processor, for example as the case may be for a video game console and separate controller. Similarly, a display, for example, for presenting views of the gameworld may be commonly housed with the processor, as in a smartphone, or separately housed, as with a monitor coupled to a video game console.

Generally, using online store 360 (by way of use of a user device 310, 320, 330, or 340), a user of system 300 may purchase or otherwise obtain goods and/or services. The type of goods and/or services sold in some embodiments may include any goods and/or services suitable for e-commerce. In the example of a videogame storefront, virtual goods may include items be used in a videogame (e.g., weapons, armors, equipment, clothes, spells, abilities, vehicles, companions, etc.), virtual currency, points, experience, new characters, new levels, new game play modes, etc. In some embodiments the types of goods available may depend on the genre of videogame. For example, in a music-based videogame, the goods may be virtual goods, and may include media (e.g., songs, album art, and/or videos) and/or new gameplay levels relating to musical works. The types of goods and/or services sold may also encompass physical good such as toys, books, CDs, videogames, magazines, t-shirts, clothing, hats, game-related memorabilia, peripherals, etc. Of course, these examples of purchasable goods and/or services are merely exemplary, and in various embodiments the online store may sell any number of goods and/or services.

In some embodiments, the user accesses online store 360 through a web browser. Alternatively or additionally, the user may access online store 360 through another application, for example a videogame or media application. Online store 360 may present different storefronts or purchasing interfaces, depending on context. For example, when accessed through a web browser or an application's virtual storefront, online store 360 may present the user with a catalog of goods and/services that the user may browser and select for purchase. In such an embodiment, the online store is the primary focus of the user's experience. However, within certain contexts, for example when a user is in the midst of gameplay or viewing a streaming movie, the online store's interface may be secondary and thus less pronounced (e.g., a small dialog box or brief audio message indicating an e-commerce opportunity). In any case, the user may use the dedicated e-commerce button (or the input button programmed to perform the functions of the dedicated e-commerce button) to perform e-commerce transactions through the online store 360.

Figure 8:
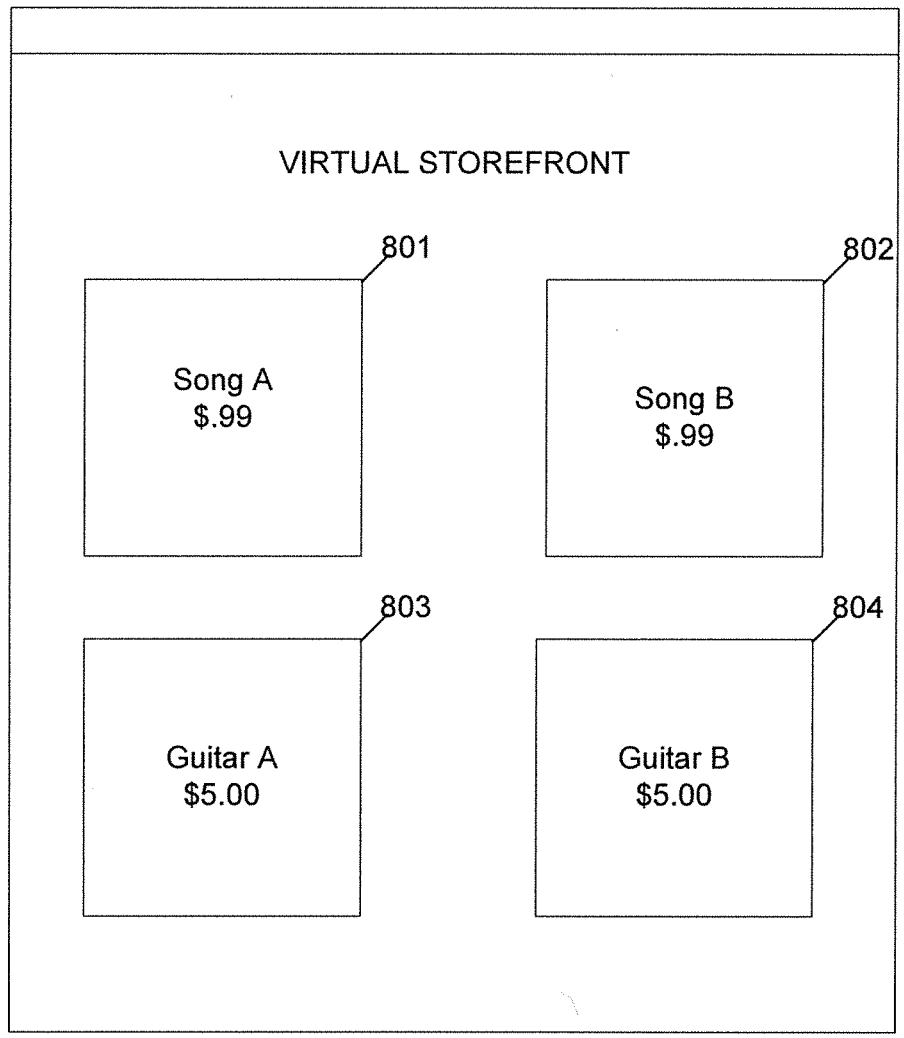
FIG. 8 illustrates a virtual storefront in accordance with aspects of the invention.

For example, online store 360 may be accessed from within a videogame through an in-game storefront interface or a game play purchasing interface. An in-game storefront is a store within a videogame that is accessed outside of gameplay. FIG. 8 depicts an illustrative in-game storefront 800 in the context of a music-based videogame (although in various embodiments aspects of the in-game storefront may be applied to any genre of videogame and application). Storefront 800 presents to the user a catalog of goods and/or services 801-804 available for e-commerce transactions. The user may select a particular good and/or service to purchase, or more commonly to place in the user's virtual shopping cart, for later purchase. Once desired items have been placed in the virtual shopping cart, the user may review and modify the contents of the shopping cart, provide the appropriate billing and shipping (if applicable) information, and complete the purchase of the desired items, or some subset of the desired items.

In accordance with aspects of the invention, the input device's e-commerce button (or the input button programmed to perform the functions of the dedicated e-commerce button), may be used as a shortcut to perform a variety of e-commerce functions associated with storefront 700. For example, the e-commerce button may be programmed so that if the user is outside of the storefront (for example, in a game menu), actuation of the e-commerce button would cause display of the storefront. As another example, when the user has selected a particular item in the catalog, the e-commerce button may be used to place the item in the user's shopping cart. As another example, when the user has selected a particular item in the catalog, the e-commerce button may be used to purchase the item using the billing and shipping information associated with the user's account. In yet another example, the e-commerce button may be used to populate an order form requesting the user's billing and shipping information. These examples are non-limiting, and in various embodiments the e-commerce button may be used to perform any e-commerce related transaction of function, including tagging a selected good and/or service for later review, adding the selected good and/or service to the user's wish list, adding the selected goods and/or services to a favorites list, gifting the selected good and/or service to a friend of the user, etc.

Figure 9:
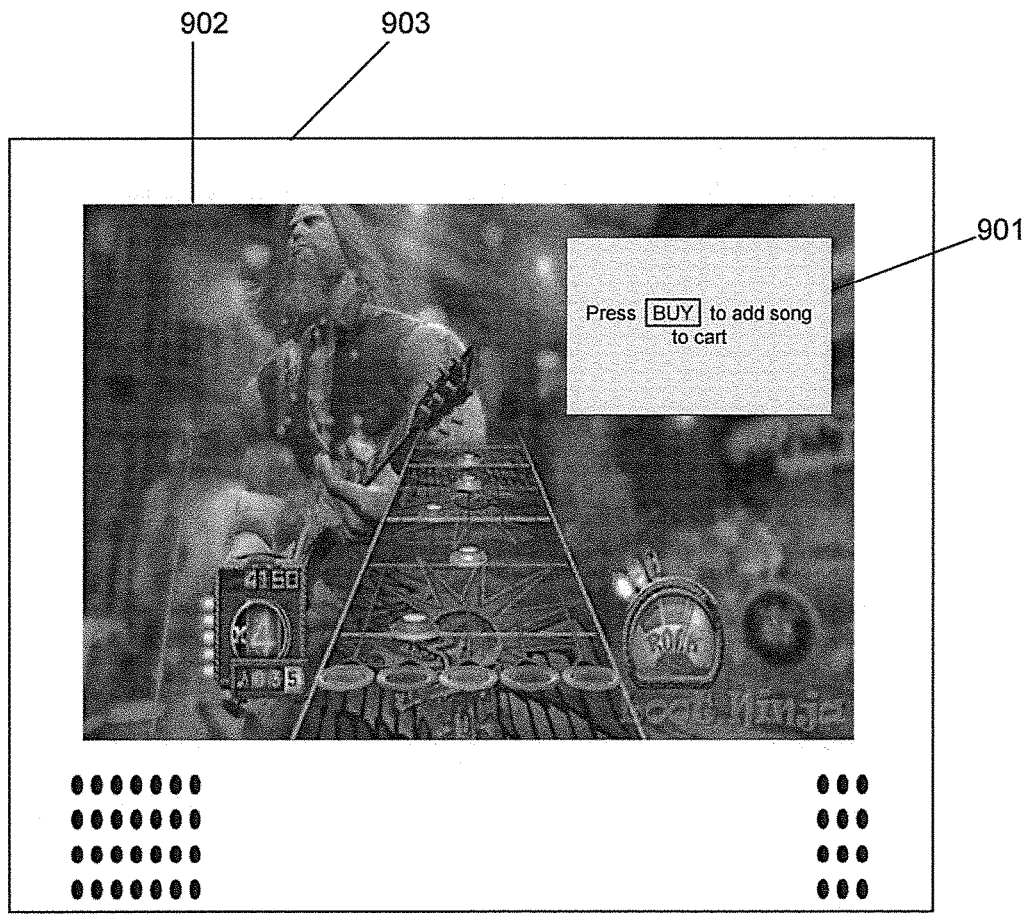
FIG. 9 illustrates a purchasing interface in accordance with aspects of the invention.

Additionally or alternatively, online store 360 may be accessed during gameplay through a game play purchasing interface. The gameplay purchasing interface allows the user to execute e-commerce transactions during gameplay and, in some embodiments, without interrupting gameplay. FIG. 9 shows an illustrative gameplay purchasing interface in the context of a music-based videogame (although in various embodiments aspects of the game play purchasing interface may be applied to any genre of videogame or any application). In the example of FIG. 9, the user is playing along to a song in a music-based videogame, with aspects of gameplay shown in a screen 902 of a display device 903. The song may be, for example, streamed from a remote server, or played from a memory device containing software for the videogame. The user does not own rights for play of the song outside the context of play of the videogame, and may not for example copy the song to memory of other devices for later enjoyment using these devices. The videogame, however, presents the user with an opportunity to place the song into the user's cart by displaying dialog box 901 informing the user that he/she may add the song to his/her cart by pressing the e-commerce button. In various embodiments the videogame may present the user an opportunity to place other items related to the videogame, or related to then-current activity in the videogame, in the shopping cart. In many embodiments the presentation of the dialog box is performed without interrupting videogame game play. If the user decides to add the song to the shopping cart, the user actuates e-commerce button of the input device, for example, the guitar-shaped input device of FIG. 2B. Because the e-commerce button can be easily accessed and actuated, the user does not need to pause or otherwise interrupt game play to purchase the song, and in many embodiments use of the e-commerce button does not pause, delay, or interrupt game play. As suggested, the e-commerce button can be programmed to conduct different e-commerce transactions, including purchasing the song, adding the song to the user's shopping cart or wish list, adding the song to a favorites list, gifting the song to a friend, tagging the song for later review, etc.

Figure 10:
FIG. 10 illustrates a further purchasing interface in accordance with aspects of the invention.

FIG. 10 shows a further illustrative gameplay purchasing interface in accordance with aspects of the invention. More particularly, FIG. 10 shows a screenshot during gameplay of a music-based video game, in which a user times operation of inputs of a game controller to position of instructive cues presented on a display. Generally, during play of the videogame a musical piece is also aurally presented, with portions of the aural presentation of the musical piece dependent on user compliance with the instructive cues.

During gameplay, and during the aural presentation, an indicator 1001 is presented on the display, with the indicator indicating that actuation of a particular controller button may be performed to make a purchase. In various embodiments the purchase is of an item related to gameplay. For example, in some embodiments the item relates to the then-presented musical piece, and the item may be for example the right to download and use a recording of the musical piece as allowed by a digital right management program. In some embodiments the indicator comprises a symbol in cross-sectional shape of and/or labeled the same as a specific button on the game controller. In some embodiments program instructions of a user device providing for gameplay and commanding display of the purchasing interface include instructions for ignoring actuation of the specific button absent presentation of the indicator on the display.

In some embodiments, online store 360 comprises a user account component that receives and/or determines user information, for example user login names and passwords, email addresses, user skill levels, game system game capabilities, gaming preferences, and/or financial information (e.g., credit card information, billing addresses, and any other information required to complete an e-commerce transaction). The financial information may be used to facilitate the e-commerce transactions described herein. For example, when a user actuates the e-commerce button to purchase a good, the user's financial information may be used to automatically complete the transaction without requiring further input from the user.

Figure 4:
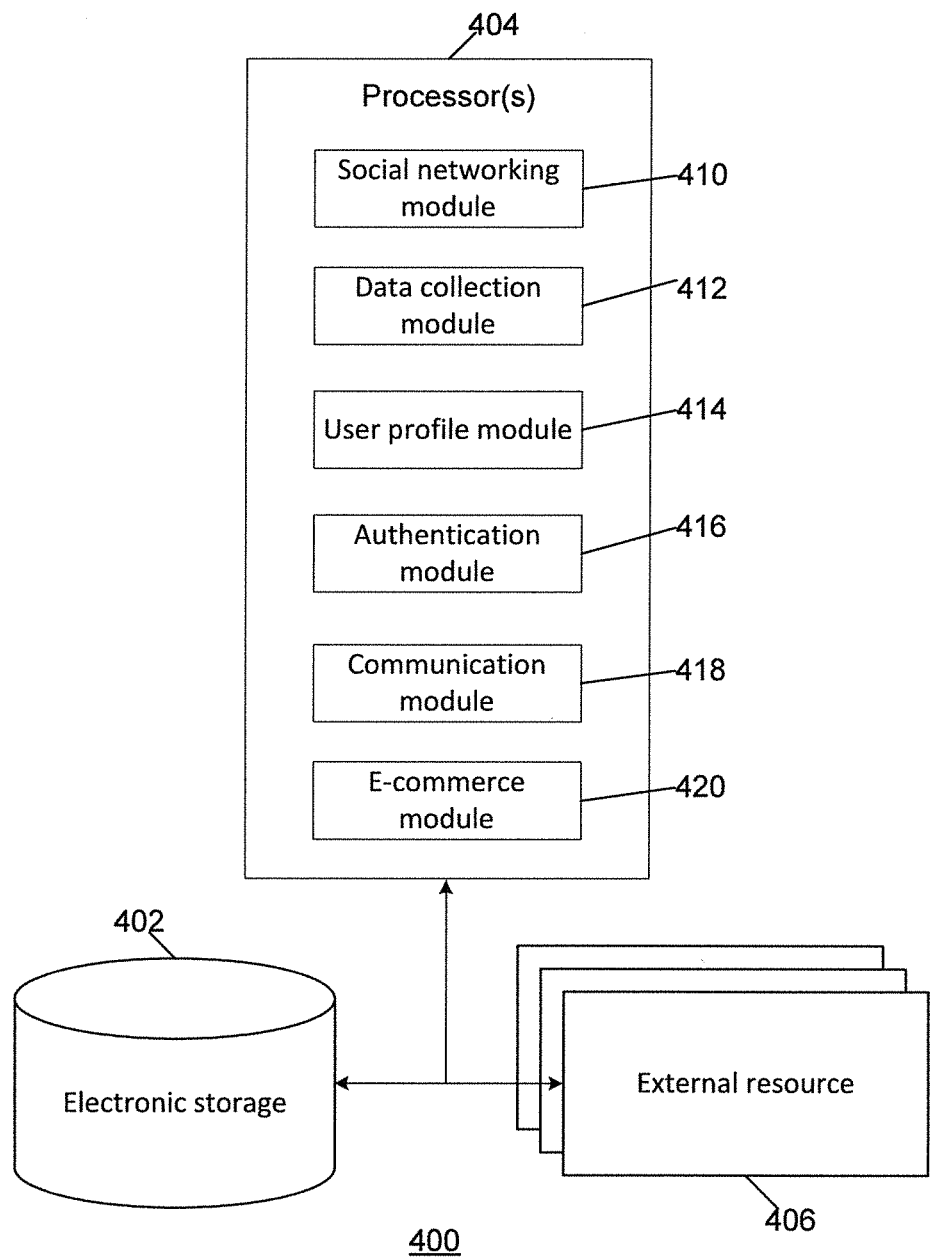
FIG. 4 illustrates an example block diagram of an online store in accordance with aspects of the invention.

FIG. 4 is an example of a block diagram of an online store 400 useful in accordance with aspects of the invention. Online store 400 is coupled to a network (not explicitly shown), for example the Internet. In some implementations, online store 400 may comprise one or more of electronic storage 402, processor(s) 404, external resources 406, and/or other components. The various components of online store 400 may be configured for electronic communication among one another. Such communication may be accomplished via one or more networks, one or more direct connections, one or more wireless connections, one or more wired connections, and/or other electronic communication media. Online store 400 may be in communication with user devices and other client computing platforms using a client/server architecture. Users, using user devices, access online store 400 through an interface internal to an application such as a videogame or media streaming application or client application and/or through a web browser. In some embodiments, online store 400 may be part of a videogame server. Additionally or alternatively, online store 400 may be separate from a videogame server.

Processor(s) 404 may be configured to provide information processing capabilities within online store 400. For example, processor(s) 404 may configured to execute computer program modules that may include one or more of a social networking module 410, a data collection module 412, a user profile module 414, an authentication module 416, a communication module 418, an e-commerce module 420, and/or other modules. In various embodiments, these modules may perform various operations as further discussed herein.

In some embodiments, e-commerce module 420 performs operations relating to conducting e-commerce transactions. For example, e-commerce module 420 may host one or more storefronts or purchasing interfaces. E-commerce module 420 may further comprise databases that store catalogs of goods and/or services available for purchase. The catalogs may contain the details about the various goods and/or services that can be listed in one or more storefronts, including pricing information, a description of the goods and/or services, fulfillment details, etc.

In some embodiments, social networking module 410 provides the framework for user-to-user interactions. Social networking module 410 may include a database that stores user relationships, user profiles, user messages, and user social data. Social networking module 410 may provide for social networking features in accordance with the present invention. For example, social networking module 410 may provide the framework to allow a user to purchase a good and/or service for another user using the input devices described above.

In some embodiments, user profile module 414 receives and/or determines user information, for example user login names and passwords, email addresses, user skill levels, game system game capabilities, gaming preferences, and/or financial information (e.g., credit card information, billing addresses, and any other information required to complete an e-commerce transaction). The financial information may be used to facilitate the e-commerce transactions described herein. For example, when a user actuates the e-commerce button to purchase a good, the user's financial information may be used to automatically complete the transaction without requiring further input from the user.

In some embodiments, data collection module 412 performs operations relating to the collection of information regarding potential host systems, user data, social networks, game data, and network connection quality indicators. In some embodiments, authentication module 416 performs operations relating to authentication of users. In some embodiments, communications module 418 performs operations relating to communication with storage and/or external resources, as well as communicating over a network, for example the Internet.

In some implementations, electronic storage 402 may include information about available games, user profile data, social networking data, data collected from previous gameplay sessions, e-commerce data, and/or other data. In some implementations, electronic storage 402 may comprise non-transitory electronic storage media that electronically stores information. Electronic storage 402 may include one or both of system storage that is provided integrally (e.g., substantially non-removable) with online store 400 and/or removable storage that is removably connectable to online store 400 via, for example, a port (e.g., a USB port, a firewire port, etc.) or a drive (e.g., a disk drive, etc.). Electronic storage 402 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 402 may include virtual storage resources, such as storage resources provided via a cloud and/or a virtual private network. Electronic storage 402 may store software algorithms, information determined by processor 404, and/or other information that enables online store 400 to function properly. Electronic storage 402 may be a separate component within online store 400, or electronic storage 402 may be provided integrally with one or more other components of online store 400. For example, in certain implementations, the non-transitory electronic storage media of electronic storage 402 may include a cache (e.g., L1 cache, L2 cache, etc.) of processor 404.

In some implementations, electronic storage 402, processor(s) 404, external resources 406, and/or other components (e.g., additional instances of game servers) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 402, processor(s) 404, external resources 406, and/or other components may be operatively linked via some other communication media.

In some implementations, the external resources 406 may include services and information sources external to online store 400, for example, third-party social networking services external to online store 400, third-party merchandising databases and catalogs, web hosting services, game server services, media streaming services, etc. In some implementations, some or all of the functionality attributed herein to external resources 406 may be provided by resources included in online store 400.

In some implementations, processor(s) 404 may include one or more of a digital processor, an analog processor, a digital circuit designed to process information, an analog circuit designed to process information, a state machine, and/or other mechanisms for electronically processing information. Although processor(s) 404 is shown in FIG. 4 as a single entity, this is for illustrative purposes only. In some implementations, processor(s) 404 may include a plurality of processing units. These processing units may be physically located within the same device, or processor(s) 404 may represent processing functionality of a plurality of distributed devices operating in coordination.

Processor(s) 404 may be configured to execute social networking module 410, data collection module 412, user profile module 414, authentication module 416, communication module 418, e-commerce module 420, and/or other modules. Processor(s) 404 may be configured to execute modules 410, 412, 414, 416, 418, 420, and/or other modules by software; hardware; firmware; some combination of software, hardware, and/or firmware; and/or other mechanisms for configuring processing capabilities on processor(s) 404.

It should be appreciated that although modules 410, 412, 414, 416, 418, and 420 are illustrated in FIG. 4 as being co-located within a single processing unit, in implementations in which processor(s) 404 includes multiple processing units, one or more of modules 410, 412, 414, 416, 418, and 420 may be located remotely from the other modules. The description of the functionality provided by the different modules 410, 412, 414, 416, 418, and 420 provided below is for illustrative purposes, and is not intended to be limiting, as any of modules 410, 412, 414, 416, 418, and 420 may provide more or less functionality than is described. For example, one or more of modules 410, 412, 414, 416, 418, and 420 may be eliminated, and some or all of its functionality may be provided by other ones of modules 410, 412, 414, 46, 418, and 420. As another example, processor 404 may be configured to execute one or more additional modules that may perform some or all of the functionality attributed below to one of modules 410, 412, 414, 416, 418, and 420.

Figure 5:
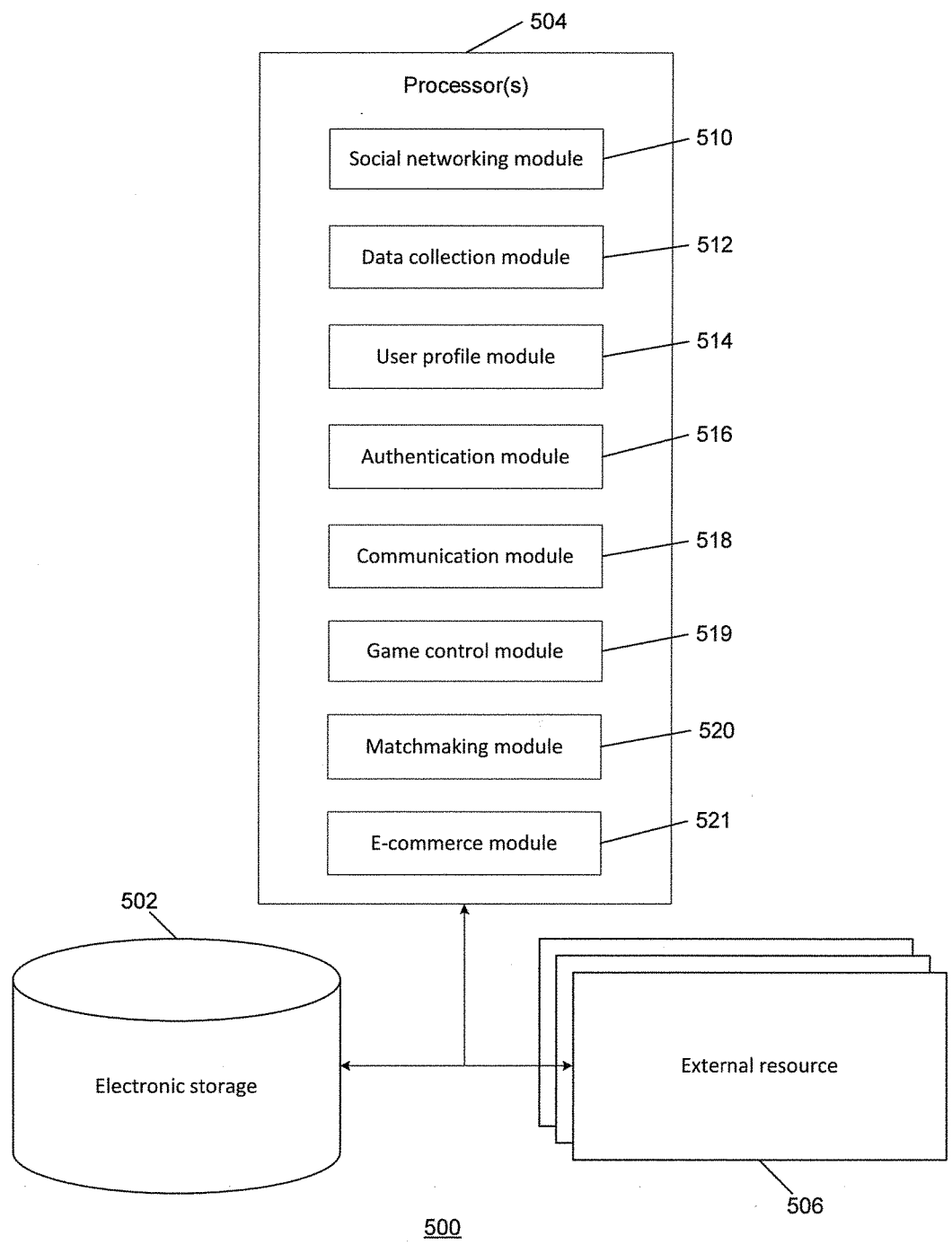
FIG. 5 illustrates an example block diagram of a game server in accordance with aspects of the invention.

FIG. 5 is an example of a block diagram of a game server 500 useful in accordance with aspects of the invention. In some embodiments the game server is the game server of FIG. 3. The game server is coupled to a network (not explicitly shown), for example the Internet. In some implementations, game server 500 may comprise one or more of electronic storage 502, processor(s) 504, external resources 506, and/or other components. The various components of game server 500 may be configured for electronic communication among one another. Such communication may be accomplished via one or more networks, one or more direct connections, one or more wireless connections, one or more wired connections, and/or other electronic communication media. Matchmaking server 500 may be in communication with user computers and other client computing platforms using a client/server architecture.

Processor(s) 504 may be configured to provide information processing capabilities within game server 500. For example, processor(s) 504 may configured to execute computer program modules that may include one or more of a social networking module 510, a data collection module 512, a user profile module 514, an authentication module 516, a communication module 518, a game control module 519, a matchmaking module 520, an e-commerce module 521, and/or other modules. In various embodiments various of the modules may not be present, in various embodiments functions of the modules may be split among other modules, and in various embodiments additional modules may be present. In various embodiments these modules may perform various operations as further discussed herein.

In some embodiments the social networking module provides social networking functions. In some embodiments the data collection module performs operations relating to collection of information regarding potential host systems, and network connection quality indicators between the potential host systems and other potential host systems and/or other game systems. In some embodiments the user profile module receives and/or determines user information, for example user skill levels, game system game capabilities, preferred game characteristics, and other user related information, for example user information for completing e-commerce transactions. In some embodiments the authentication module performs operations relating to authentication of users and potential hosts. In some embodiments the communications module performs operations relating to communication with storage and/or external resources, as well as communicating over a network, for example the Internet. In some embodiments the game control module provides for play of an online videogame, and in some embodiments the game control module provides for coordination of a multiplayer videogame. In some embodiments the matchmaking module performs operations relating to matching user game systems with host game systems for multiplayer video gaming sessions. In some embodiments the e-commerce module provides functions of an online store, and in some embodiments the e-commerce module provides processing for information for communicating with an online store and/or user interacting with a videogame system desiring to purchase or investigate items from an online store.

In some implementations, electronic storage 502 may include information about available games, user profile data, data collected from previous gameplay, and/or other data for example items available for purchase or user transaction related data. In some implementations, electronic storage 502 may comprise non-transitory electronic storage media that electronically stores information. Electronic storage 502 may include one or both of system storage that is provided integrally (e.g., substantially non-removable) with game server 500 and/or removable storage that is removably connectable to matchmaking server 500 via, for example, a port (e.g., a USB port, a firewire port, etc.) or a drive (e.g., a disk drive, etc.). Electronic storage 502 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 502 may include virtual storage resources, such as storage resources provided via a cloud and/or a virtual private network. Electronic storage 502 may store software algorithms, information determined by processor 304, information received via client computing platforms 508, and/or other information that enables game server 500 to function properly. Electronic storage 502 may be a separate component within game server 500, or electronic storage 502 may be provided integrally with one or more other components of matchmaking server 500. For example, in certain implementations, the non-transitory electronic storage media of electronic storage 502 may include a cache (e.g., L1 cache, L2 cache, etc.) of processor 504.

In some implementations, electronic storage 502, processor(s) 504, external resources 506, and/or other components (e.g., additional instances of game server system 500) may be operatively linked via one or more electronic communication links. For example, such electronic communication links may be established, at least in part, via a network such as the internet and/or other networks. It will be appreciated that this is not intended to be limiting, and that the scope of this disclosure includes implementations in which electronic storage 502, processor(s) 504, external resources 506, and/or other components may be operatively linked via some other communication media.

In some implementations, the external resources 506 may include services and sources of information external to game server 500, for example online stores, or lists of available items for an online store external to game server 500. In some implementations, some or all of the functionality attributed herein to external resources 506 may be provided by resources included in game server 500.

In some implementations, processor(s) 504 may include one or more of a digital processor, an analog processor, a digital circuit designed to process information, an analog circuit designed to process information, a state machine, and/or other mechanisms for electronically processing information. Although processor(s) 504 is shown in FIG. 5 as a single entity, this is for illustrative purposes only. In some implementations, processor(s) 504 may include a plurality of processing units. These processing units may be physically located within the same device, or processor(s) 504 may represent processing functionality of a plurality of distributed devices operating in coordination.

Processor(s) 504 may be configured to execute the various modules discussed above, and/or other modules. Processor(s) 504 may be configured to execute the modules by software; hardware; firmware; some combination of software, hardware, and/or firmware; and/or other mechanisms for configuring processing capabilities on processor(s) 504.

It should be appreciated that although various modules are illustrated in FIG. 5 as being co-located within a single processing unit, in implementations in which processor(s) 504 includes multiple processing units, one or more of the modules may be located remotely from the other modules. The description of the functionality provided by the different modules is for illustrative purposes, and is not intended to be limiting, as any of the modules may provide more or less functionality than is described. For example, one or more of the modules may be eliminated, and some or all of its functionality may be provided by other ones of modules. As another example, processor 304 may be configured to execute one or more additional modules that may perform some or all of the functionality attributed to one of the modules.

Figure 6:
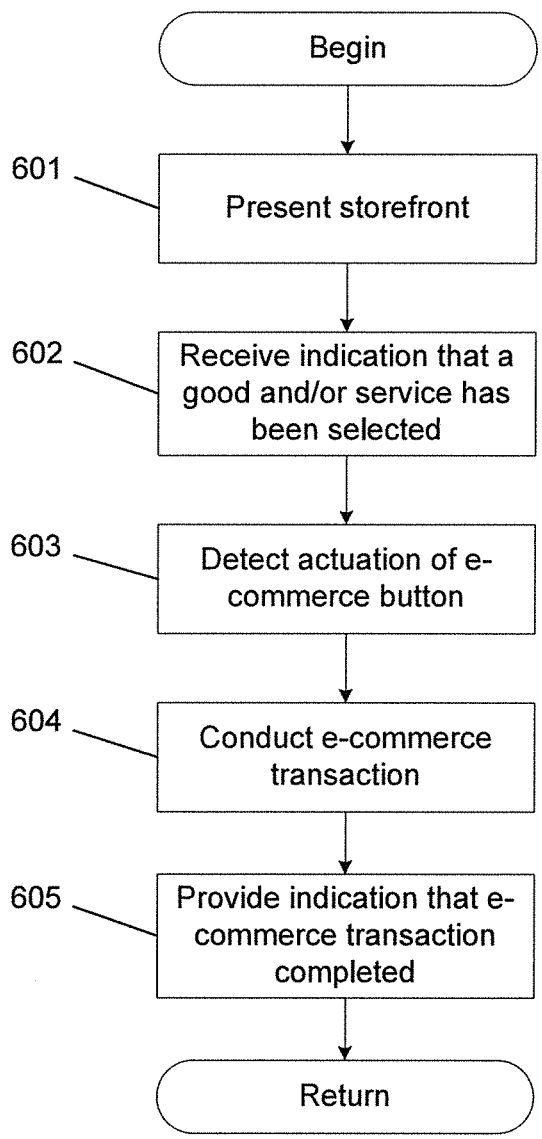
FIG. 6 is a flow chart of a process for conducting e-commerce transactions in accordance with aspects of the invention.

FIG. 6 is a flow chart of a process for conducting e-commerce transactions in accordance with aspects of the invention. The process may be performed, for example, by the systems and components described in connection with FIGS. 1-5.

In block 601, the process presents an e-commerce storefront. The storefront may be presented, for example, in a web browser in the form of an e-commerce website (e.g., www.amazon.com, www.ebay.com, www.walmart.com, etc.). Additionally or alternatively, the storefront may be presented in a client application, for example a videogame, a smartphone application, an e-commerce application installed on a personal computer, or any other application in which the user is presented with purchasing opportunities. The storefront presents one or more goods and/or services for purchase.

In block 602, the process receives an indication that a good and/or service has been selected. For example, in the example of an e-commerce website, the user may mouse click to select a good and/or service from a catalog of available goods and/or services. As another example, if the storefront is within a smartphone application, the user may use a touchscreen to select a desired good and/or service. In a videogame, the user may use a videogame controller to select a desired good and/or service. The foregoing examples are merely exemplary, and any method of selection may be used, including, for example, hovering a cursor over a desired good, double clicking a desired good, using an input button to select a desired good, etc.

In block 603, the process detects the actuation of an e-commerce button. In some embodiments, the e-commerce button may be a dedicated e-commerce button with no other function than to perform an e-commerce transaction. In some embodiments, the e-commerce button may be one of many e-commerce buttons, each with a programmed e-commerce function. In some embodiments, the e-commerce button may be a standard input button that has been programmed to perform the functions of an e-commerce button. For example, on a computer keyboard, a function key (e.g., F1, F2, F3, etc.) or any other standard key may be programmed to perform the function of an e-commerce button. On a computer mouse, the right-click mouse button may be programmed to perform the function of an e-commerce button (in certain contexts, for example, within a shopping application). On a videogame controller, one of the standard input buttons, the start button, and/or the select button may be programmed to perform the functions of an e-commerce button. The foregoing examples are merely exemplary, and any input button may be programmed, either by the application or by the user, to perform the functions of an e-commerce button.

In block 604, the process conducts an e-commerce transaction in response to detecting the actuation of the e-commerce button. E-commerce transactions include, for example, tagging the selected item for later review, adding the selected item to the user's shopping cart, purchasing the selected item, gifting the selecting item to another user, adding the selected item to the user's wish list, adding the selected item to a favorites list, etc. The specific e-commerce transaction to be performed may, in some embodiments, be programmed by the application or the user. In some embodiments, the e-commerce transaction may depend on the context. For example, if the user is browsing a catalog of goods, the e-commerce button may be used to place a selected item into the shopping cart. However, when viewing the goods placed into the shopping cart, the e-commerce button may be used to complete the transaction (i.e., purchase the goods in the shopping cart).

In block 605, the process determines if the e-commerce transaction completed successfully and provides an indication to the user. The indication may inform the user using visual displays, audio, or both. The indication can inform the user whether the e-commerce transaction succeeded or failed and, if the transaction failed, the reason for failure. Additionally and/or alternatively, the process may inform the user outside of the application, for example, by sending an email to the user's registered email account or by posting a message to the user's account inbox. Once the e-commerce transaction has been completed, the process returns.

Figure 7:
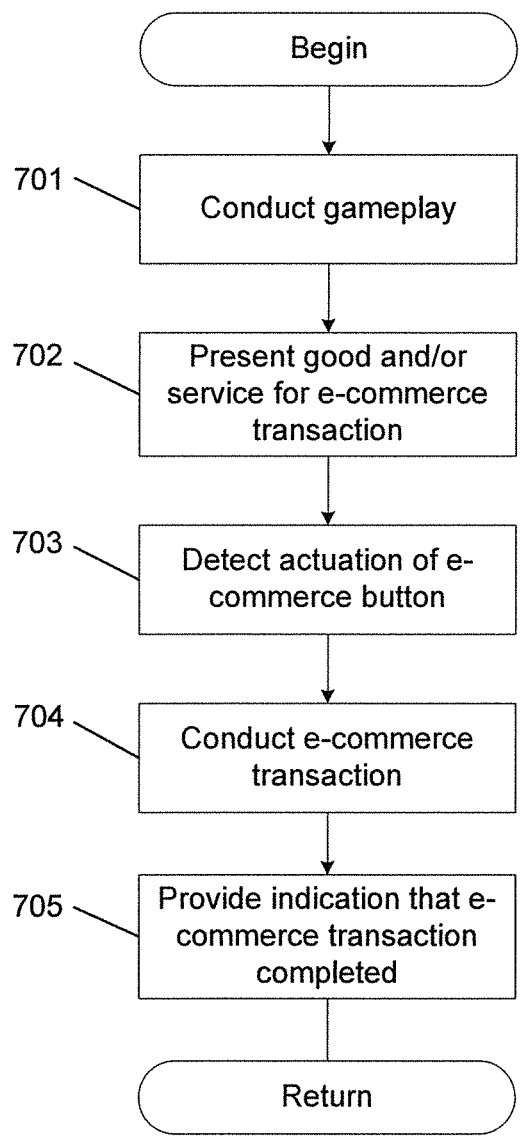
FIG. 7 is a flow chart of a further process for conducting e-commerce transactions in accordance with aspects of the invention.

FIG. 7 is a flow chart of a process for conducting e-commerce transactions in accordance with aspects of the invention. The process may be performed by the systems and components described in connection with FIGS. 1-5.

In block 701, the process conducts game play for a videogame.

In block 702, the process presents a good and/or service for purchase during game play. In some embodiments, the good and/or service is presented in a manner that does not interrupt gameplay. For example, in a music-based videogame, the user may be playing a song that is being streamed from a game server, which the user does not own in his/her personal library. If the user decides he/she likes the song and would like to purchase the song, the user may actuate the e-commerce button, for example during the song's playback, to conduct an e-commerce transaction for the song. The process may, in some embodiments, provide an indication that the song is available for purchase, for example, by displaying a dialog box or some other visual indication informing the user that he/she may purchase the song (or conduct some other transaction, for example, placing the song in the user's shopping cart) by pressing the e-commerce button. Additionally or alternatively, the process may provide an audio indication (for example a spoken message) informing the user that he/she may purchase the song by pressing the e-commerce button. As another example, in a role-playing videogame, the user may be presented with opportunities to buy weapons or other virtual goods during gameplay. After presenting a visual or audio indication of the purchasing opportunity, the user may use the e-commerce button to conduct the e-commerce transaction. These examples are non-limiting, and purchasing opportunities may be presenting in all genres of videogames for virtually any goods and/or services.

In block 703, the process detects the actuation of an e-commerce button. As discussed above, in some embodiments, the e-commerce button may be a dedicated e-commerce button without other function than to perform an e-commerce transaction. In some embodiments, the e-commerce button may be one of many e-commerce buttons, each with a programmed e-commerce function. In some embodiments, the e-commerce button may be a standard input button that has been programmed to perform the functions of an e-commerce button. For example, on a computer keyboard, a function key (e.g., F1, F2, F3, etc.) or any other standard key may be programmed to perform the function of an e-commerce button. On a computer mouse, the right-click mouse button may be programmed to perform the function of an e-commerce button (in certain contexts, for example, within a shopping application). On a videogame controller, one of the standard input buttons, the start button, and/or the select button may be programmed to perform the functions of an e-commerce button. The foregoing examples are merely exemplary, and any input button may be programmed, either by the videogame or by the user, to perform the functions of an e-commerce button.

In some embodiments a user device conducting game play, for example the user devices 310-340 of FIG. 3, detects actuation of the e-commerce button. In such embodiments the user device may communicate detection of the e-commerce button to an online store, for example the online store 360 of FIG. 3, or a game server, for example the game server 370 of FIG. 3. In addition to communicating the detection of actuation of the e-commerce button, the user device may also communicate information regarding a desired action, for example information relating to a desired transaction or a request for information regarding potential transactions. In some such embodiments, a game server may receive communication from a user device indicating detection of actuation of the e-commerce button, and communicate that information, and possibly associated information, to an online store. As variously the user device, the game server, and the online store may all receive information that the e-commerce button has been actuated, in various embodiments it may be considered that one, some, or all of them has detected actuation of the e-commerce button.

In block 704, the process conducts an e-commerce transaction in response to detecting the actuation of the e-commerce button. E-commerce transactions include, for example, tagging the selected item for later review, adding the selected item to the user's shopping cart, purchasing the selected item, gifting the selecting item to another user, adding the selected item to the user's wish list, adding the selected item to a favorites list, etc. The specific e-commerce transaction to be performed may, in some embodiments, be programmed by the application or the user. In some embodiments, the e-commerce transaction may depend on the context.

In block 705, the process determines if the e-commerce transaction completed successfully and provides an indication to the user. The indication may inform the user using visual displays, audio, or both. The indication can inform the user whether the e-commerce transaction succeeded or failed and, if the transaction failed, the reason for failure. Additionally and/or alternatively, the process may inform the user outside of gameplay, for example, by sending an email to the user's registered email account or by posting a message to the user's account inbox. Once the e-commerce transaction has been completed, the process returns.

Although the invention has been discussed with respect to certain embodiments, it should be recognized that the invention comprises the novel and non-obvious claims and their insubstantial variations supported by this disclosure.

What is claimed is:

1. A method performed by a videogame system that comprises at least a processor, and an input device, the method comprising:
   conducting the gameplay of the videogame using the input device;
   while the gameplay is being conducted and without pausing, delaying, or interrupting the gameplay:
      presenting to a user an item for purchase during gameplay of the videogame, the item being a virtual good usable in the gameplay and related to a then-current aspect of the gameplay;
      detecting, while the item is presented to the user for purchase, actuation of a button of the input device having a shape of an object seen on screen and manipulated by a game avatar during gameplay a videogame, the button being dedicated for use with commercial transactions; and
      responsive to detection of the actuation of the button dedicated for use with commercial transactions, performing at least one action for conducting a commercial transaction involving the item, without affecting the gameplay.

2. The method of claim 1, wherein the shape of the input device is a guitar shape and the input device is suitable for use with a music-based videogame.

3. The method of claim 1, wherein the at least one action for conducting the commercial transaction involving the item comprises transmitting an indication of the actuation of the button dedicated for use with commercial transactions to an online store.

4. The method of claim 1, wherein the videogame system further includes a game server with an e-commerce module performing operations relating to conducting e-commerce transactions.

5. The method of claim 1, wherein the videogame system further includes an online store usable with the button dedicated for use with commercial transactions.

6. The method of claim 1, wherein the at least one action for conducting the commercial transaction involving the item comprises placing the item in a virtual shopping cart for the user.

7. The method of claim 1, wherein the at least one action for conducting the commercial transaction involving the item comprises completing a sale of the item using pre-stored financial information.

8. The method of claim 1, further comprising programming the button dedicated for use with commercial transactions to perform a specific action for conducting the commercial transaction involving the item.

9. The method of claim 1, further comprising:
   determining if the commercial transaction involving the item completed successfully; and
   providing an indication that the commercial transaction involving the item has been completed.

10. The method of claim 9, wherein the providing the indication that the commercial transaction involving the item has been completed comprises sending an email to the user.

11. One or more tangible non-transitory computer-readable storage media having instructions stored thereon that, when executed by a computing device, cause the computing device to perform acts, the acts comprising:
   presenting to a user a virtual good usable in the gameplay of the videogame available for purchase during gameplay of a videogame;
   receiving an indication that the user has selected the virtual good using an input device providing input to the videogame during the gameplay of the videogame, the input device having a shape of an object seen on screen and manipulated by a game avatar during the gameplay;
   detecting an activation of a button on the input device during the gameplay of the videogame, the button being dedicated solely for use in conducting an e-commerce transaction; and
   responsive to detecting the activation of the button, performing an e-commerce transaction for the virtual good.

12. A videogame system including an input device, comprising:
   a videogame console suitable for use in videogame play, the videogame console including a processor for executing program instructions for the videogame play, the program instructions for the videogame play including instructions for processing inputs from the input device;
   the input device including one or more input buttons configured to allow a user to provide input to a videogame console for the videogame play, the input device also including an e-commerce button, the e-commerce button being separate from the one or more input buttons and dedicated for use with e-commerce transactions, the e-commerce transactions including virtual goods usable in the videogame play, the input device having a shape of an object seen on screen and manipulated by a game avatar during the gameplay; and
   memory containing the program instructions for the videogame play, with the program instructions for the videogame play further including program instructions to cause performance with respect to an e-commerce transaction when the e-commerce button is activated during the videogame play.

13. The system of claim 12, wherein the performance with respect to the e-commerce transaction comprises placing an item in a virtual shopping cart.

14. The system of claim 12, wherein the performance with respect to the e-commerce transaction comprises transmitting a request for purchase of an item, the request including pre-stored financial information.

15. The system of claim 12, wherein the input device is guitar-shaped.

16. The system of claim 12, wherein the program instructions include program instructions for presentation of an indication of availability of an item for purchase during the videogame play, and program instructions for ignoring activation of the e-commerce button absent presentation of the indication of availability of the item for purchase.

17. The system of claim 12, wherein the e-commerce transactions further include physical goods.

* * * * *